United States Patent [19]
Jeung

[11] Patent Number: 5,985,359
[45] Date of Patent: *Nov. 16, 1999

[54] SUBSTRATE FOR A LIQUID CRYSTAL DISPLAY AND METHOD FOR MANUFACTURING SAME

[75] Inventor: Se-Han Jeung, Seoul, Rep. of Korea

[73] Assignee: Samsung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/713,942

[22] Filed: Sep. 13, 1996

[30] Foreign Application Priority Data

Oct. 30, 1995 [KR] Rep. of Korea ...................... 95-38050

[51] Int. Cl.⁶ ...................................................... B05D 5/06
[52] U.S. Cl. ........................... 427/165; 427/162; 427/164
[58] Field of Search ..................... 428/210, 336, 428/428, 426, 701, 698, 1, 432; 345/3, 38, 87, 104; 368/30, 84, 242; 399/4; 427/162, 164, 165

[56] References Cited

U.S. PATENT DOCUMENTS

| | | | |
|---|---|---|---|
| 4,618,538 | 10/1986 | Emonts et al. | 428/428 |
| 5,137,779 | 8/1992 | Hinz et al. | 428/210 |
| 5,149,351 | 9/1992 | Yaba et al. | 65/60.5 |

FOREIGN PATENT DOCUMENTS

| | | |
|---|---|---|
| 0122442 | 10/1978 | Japan . |
| 406273780 | 9/1994 | Japan . |

OTHER PUBLICATIONS

Japanese Publication No. 01238127 A, "Substrate Holding Device".

*Primary Examiner*—Archene Turner
*Attorney, Agent, or Firm*—Jones Volentine, L.L.P.

[57] ABSTRACT

A LCD substrate having a supporting buffer film formed around it outer edges and method for making same.

4 Claims, 2 Drawing Sheets

SUBSTRATE FOR A LIQUID CRYSTAL DISPLAY AND METHOD FOR MANUFACTURING SAME

BACKGROUND OF THE INVENTION

The present invention relates to a substrate for a liquid crystal display (LCD) and method for manufacturing same. More particularly, the invention relates to an LCD substrate formed with a bordering buffer film which reduces substrate warping. The present invention also relates to a method for manufacturing the foregoing LCD substrate.

The conventional manufacturing process for LCDs begins with a glass substrate. The glass substrate is cleaned, or "washed," and a matrix of thin film transistors (TFTs) and related pixel elements are formed on the glass substrate by known techniques. A liquid crystal is then injected into a space between the thus fabricated glass substrate structure and an opposing color filter substrate, or similar opposing surface.

of particular note, the conventional glass substrate is flexible to a certain degree. For example, a conventional glass substrate 1 will bow or curve in the middle when carried on edge supports 6, as shown in FIG. 1. The bow shown in FIG. 1 is exaggerated to illustrate the difficulty arising when even slight bowing occurs in the glass substrate. That is, bowing may cause lifting or shifting of the semiconductor layers subsequently formed on the conventional glass substrate. For example, the aluminum film forming the gate electrodes of the TFTs may separate from the substrate and actually create shorts and opens in the electrode paths. Bowing, warping in any direction, may become particularly pronounced in high temperatures applied to the glass substrate during heat treatment steps common to the manufacture of the LCD. As LCDs increase in size, the tendency of the underlying glass substrate to warp under its own weight only increases. The resulting effects of glass substrate warping can be disastrous.

SUMMARY OF THE INVENTION

In order to reduce LCD substrate warping and the attendant problems, the present invention provides an improve d glass substrate having a buffer film formed on peripheral edges of the LCD substrate. The buffer film may be formed on selected edges of the LCD substrate, or as a "border" around the entire periphery of the LCD substrate.

In one aspect, the present invention provides a substrate adapted for use in a Liquid Crystal Display (LCD) having a buffer film formed on the substrate proximate a peripheral edge of the substrate. The buffer film is preferably formed of aluminum oxide, tantalum oxide, barium oxide, titanium oxide, silicon oxide, or silicon nitride to a thickness greater than 500 Å.

In another aspect, the present invention provides a method of manufacturing a substrate adapted for use in a Liquid Crystal Display (LCD) wherein a buffer film is formed on the substrate proximate a peripheral edge of the substrate.

The buffer film is preferably formed of aluminum oxide, tantalum oxide, barium oxide, titanium oxide, silicon oxide, or silicon nitride to a thickness greater than 500 Å by positioning a shadow mask having an exposure pattern formed therein over the substrate, and depositing the buffer film on the substrate through the exposure pattern.

BRIEF DESCRIPTION OF THE DRAWING

The advantages of the present invention will become more apparent upon consideration of a detail embodiment with reference to the attached drawings in which.

DETAILED DESCRIPTION OF THE RREFERRED EMBODIMENT

Figure 1:
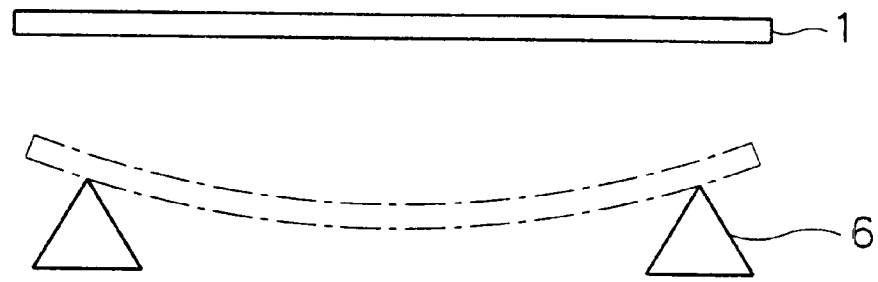
FIG. 1 is an edge view of a conventional LCD substrate supported at either end which illustrates the problem of LCD substrate warping.
Figure 2:
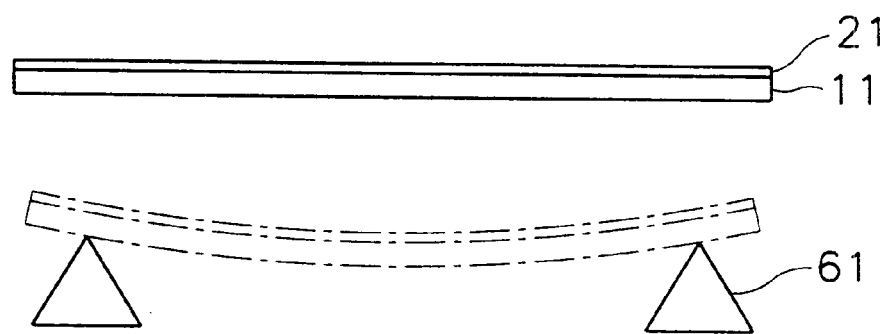
FIG. 2 is an edge view of a LCD substrate formed according to the present invention supported at either end by two supporters.
Figure 3:
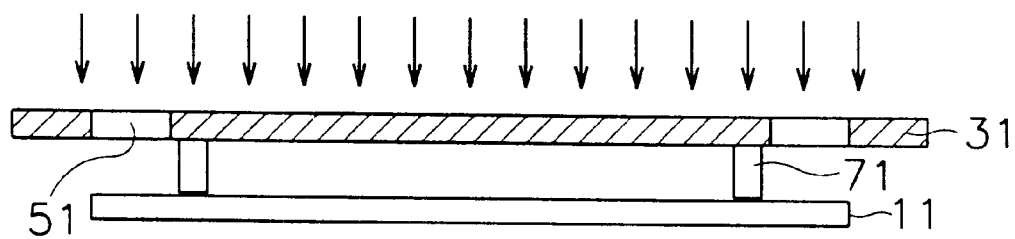
FIGS. 3 and 4 are cross sectional views illustrating a method of manufacturing an LCD substrate according to the present invention; and, FIG. 5 is a perspective view showing the relationship between the mask used to form the buffer film and the resulting LCD substrate as prescribed by the present invention.
Figure 4:
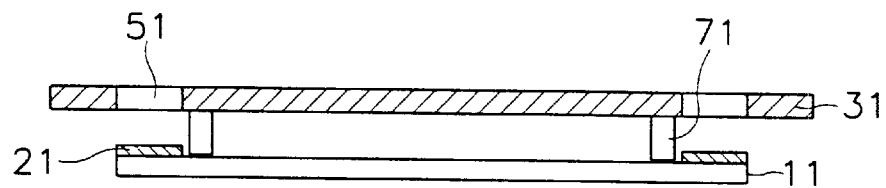

The edge view in FIG. 2 illustrates an improved LCD substrate having a buffer film 21 formed on, and around the peripheral edges of LCD 11. Thus formed, the buffer film 21 reduces bowing of the LCD substrate. Compare the resulting bow when the improved LCD substrate is placed on edge supports 61.

Figure 5:
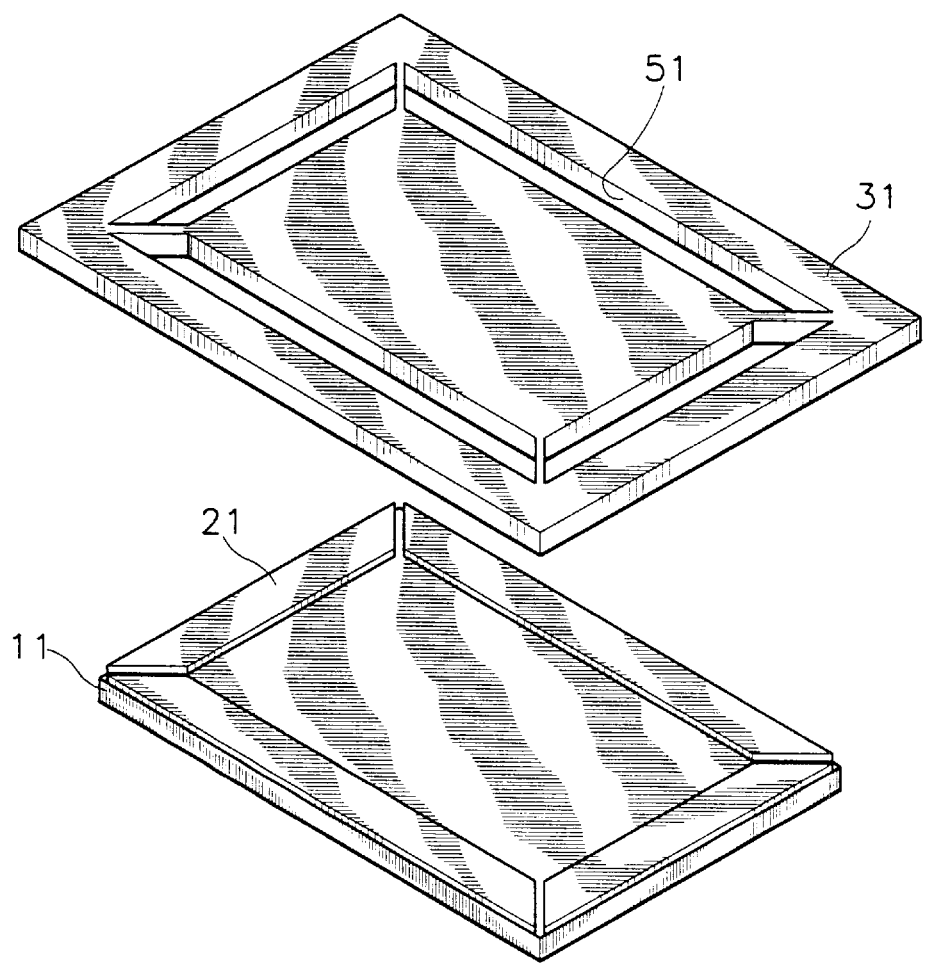

According to a presently preferred method, the improved LCD substrate may be manufactured in the following manner. A glass substrate 11 is washed and prepared for subsequent processing. Using mask supports 71, a shadow mask 31 having a predetermined exposure pattern 51 is positioned above glass substrate 11. In the presently preferred example, the exposure pattern 51, best seen in FIG. 5, comprises a set of elongated strips positioned above the outer periphery of glass substrate 11.

Once the shadow mask is in place, a buffer film 21 is formed on only the portions of glass substrate 11 exposed by exposure pattern 51. The buffer film 21 should be formed from a material resistant to thermal transformation, such as aluminum oxide, tantalum oxide, barium oxide, titanium oxide, silicon oxide or silicon nitride. In the preferred embodiment, the buffer film was deposited using known techniques to a thickness greater than 500 Å.

Since buffer film 21 is formed on the periphery of glass substrate 11, the glass substrate operates in the LCD without reduced transmittivity. The use of known deposition techniques and the absence of patterning to form buffer film 21 makes manufacturing simple and cost effective.

Buffer film 21 supports to the LCD substrate during subsequent manufacturing steps with reduced bowing, sagging, or warping. The more stable LCD substrate leads to fewer defects in the resulting LCD.

The present invention is not restricted to the above embodiments, and it is clearly understood that many variations are possible within the scope and spirit of the present invention by anyone skilled in the art.

What is claimed is:

1. A method of reducing bowing in a substrate adapted for use in a Liquid Crystal Display (LCD), comprising:
   providing an LCD substrate; and
   forming a buffer film on the substrate proximate a peripheral edge of the substrate to reduce bowing of the substrate during manufacturing.

2. The method of claim 1, wherein the buffer film is formed from one member selected from a group consisting of aluminum oxide, tantalum oxide, barium oxide, titanium oxide, silicon oxide, and silicon nitride.

3. The method of claim 2, wherein the buffer film has a thickness greater than 500 Å.

4. A method for reducing bowing in a substrate adapted for use in a Liquid Crystal Display (LCD), comprising:

provtwo a glass substrate; and forming a buffer film on the glass substrate proximate a peripheral edge of the glass substrate to reduce bowing of the substrate during manufacturing, wherein the buffer film is formed from one member selected from a group consisting of aluminum oxide, tantalum oxide, barium oxide, titanium oxide, silicon oxide, and silicon nitride.

* * * * *